March 23, 1943.  B. BORLAND  2,314,814
SEAL
Filed Jan. 5, 1940
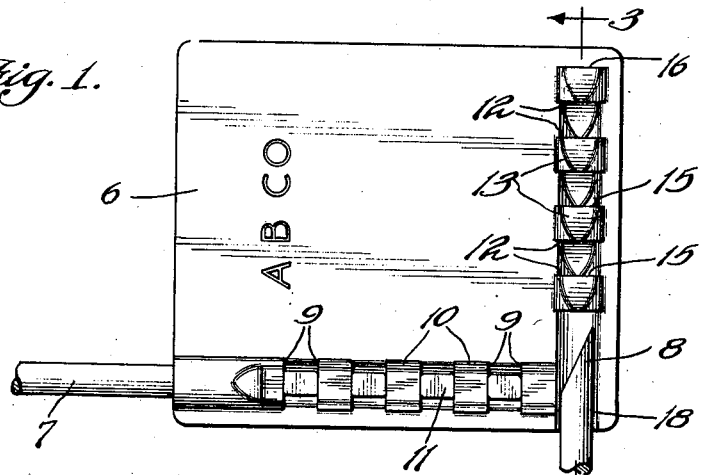
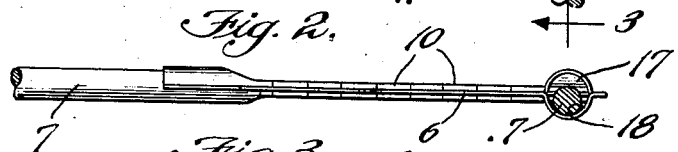
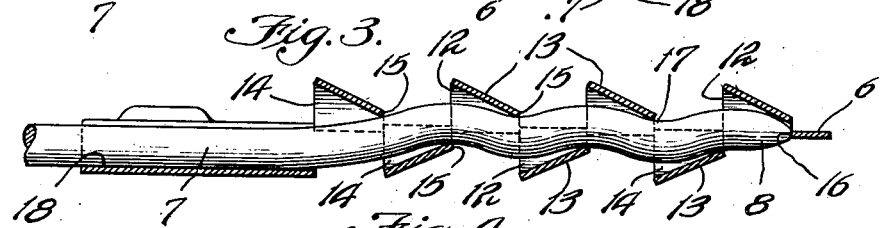
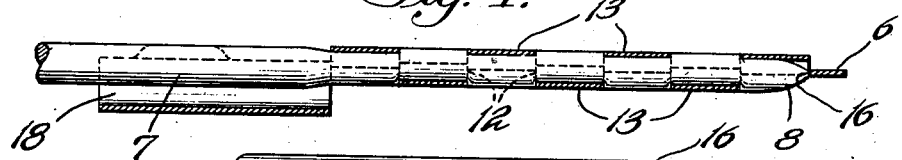
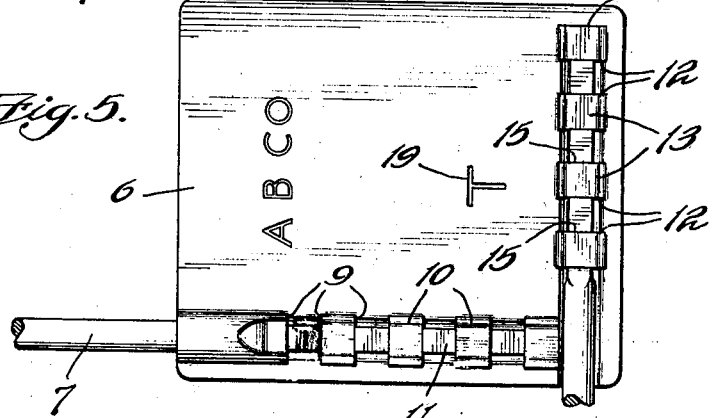
INVENTOR.
Bruce Borland
BY Glenn S. Noble
ATTORNEY.

Patented Mar. 23, 1943

2,314,814

UNITED STATES PATENT OFFICE 2,314,814

SEAL

Bruce Borland, Chicago, Ill.

Application January 5, 1940, Serial No. 312,567

3 Claims. (Cl. 292—315)

This invention pertains to seals of the car seal type but particularly intended for marking or identifying purposes. An example of the use of the present seals is for marking meat products in order to identify the same and to indicate the days on which the seals are applied.

The objects of this invention are to provide a seal which may be made of inexpensive non-corrodable material; to provide a seal which may be cheaply manufactured and which may be readily applied, particularly to pieces of meat or the like; to provide a seal which may be easily closed or fastened by means of a seal press and which may not thereafter be opened or disconnected and again used without indicating that it has been tampered with; to provide a device of this character which may be readily marked, indented or embossed by a seal press for identification or dating purposes; to provide a seal having a wire portion and having a plate portion with an undulating tunnel for receiving the end of the wire, said tunnel being formed principally of oppositely disposed straps of conical or tapered formation to facilitate the entry of the end of the wire; and to provide such other novel features and advantages as will appear more fully from the following description.

In the accompanying drawing illustrating this invention,

Figure 1 is a plan view of the seal with the shackle or wire broken away;

Figure 2 is an edge view of the same;

Figure 3 is a sectional view taken on the line 3—3 of Figure 1 and shown on an enlarged scale;

Figure 4 is a view similar to Figure 3 but showing the seal after it has been acted upon by the press; and Figure 5 is a plan view showing the seal after it has been locked or fastened by the seal press and a letter or character embossed thereon.

The drawing is made on an enlarged scale for convenience in illustration as the common commercial form of such seals use wire of about $\frac{1}{32}$ of an inch in diameter and a plate approximately $\frac{7}{8}$ of an inch wide. My improved sealing device comprises a plate 6, preferably formed of thin non-corrodable metal such as sheet tin and a wire or shackle 7 also formed of non-corrodable metal and preferably having a sharpened end or point 8 so that it may be readily pushed through a piece of meat or the like. One side of the plate or fastening member 6 has a plurality of short parallel cuts or slits 9 forming intermediate cross bars or straps 10. Each alternate strap is bent outwardly to approximately semi-circular cross section, the alternate straps being pressed outwardly on the opposite sides of the plate to form a longitudinal opening or tunnel for receiving one end 11 of the wire 7. After the end of the wire has been inserted the parts are fastened together preferably by means of a power press which tends to flatten and bend the wire and cause the straps 10 to be more or less embedded therein so that it is practically impossible to remove the wire without breaking the same.

Another portion of the plate, preferably at substantially right angles, is slit at a plurality of places as indicated at 12 to form straps or keepers 13, the adjacent ones being bent in opposite directions from the plane of the plate as shown particularly in Figure 3. These oppositely disposed strap portions are tapered or somewhat conical shaped so that each one presents a tapered opening or guideway 14 for receiving and directing the end 8 of the wire as it is inserted in the tunnel or opening formed by such straps. The innermost edges 15 are spaced from the axial center of the tunnel a distance slightly less than half the diameter of the wire which makes a slightly tortuous passageway for the wire and these edges tend to bite into or impinge upon the wire so that they tend to hold the end when it is inserted preparatory to applying the press. The edge of the plate at the last slit or cut provides an abutment or stop 16 to limit the insertion of the wire in the tunnel or opening 17 formed by the oppositely disposed straps. The plate is also depressed or grooved as shown at 18 to form a short guideway to the entrance to the tunnel so that the end of the wire may be placed in such groove and conveniently shoved into the fastening portion.

When the seal is to be applied the end 8 of the wire is passed through the parts to be sealed, or through a piece of meat, it being understood that the wire may be bent around from the fastened end in any convenient way, and the point 8 is then placed in the groove 18 and then shoved through the opening between the straps until the end strikes the abutment 16. When the wire is thus inserted there is a slight tendency to deform the same as it passes from one strap to the other so that it is waved as shown. After the end has been thus inserted it is subjected to the action of the press which smashes down the bars or straps 13 and slightly ends the wire so that all of these parts are interlocked as shown in Figure 4.

The press may also be provided with means for embossing a letter or figure in the plate as shown at 19 to indicate the time the seal was applied or the person applying the same, or for any other desired purpose.

Having thus described my invention, what I claim is:

1. In a seal, the combination of a plate, a wire having one end secured to the plate, a plurality of substantially parallel slits in one portion of the plate forming intermediate straps, the adjacent straps being bent outwardly on opposite sides of the plate with their outer portions tapered toward their entry ends to facilitate the entry of the wire and guiding the same past said straps, the plate adjacent to the last slit forming an abutment or stop to limit the entry of the wire.

2. In a device of the car seal type, the combination of a plate formed of sheet metal, a wire having one end secured to the plate with the other end normally free before being sealed, a tunnel in the plate for receiving the free end of the wire, said tunnel being formed of oppositely disposed straps formed integrally with the plate, the trailing edges of the straps being spaced away from the plate less than the diameter of the wire whereby the wire will closely engage said edges when the free end is inserted in the tunnel.

3. A seal of the character set forth comprising a plate formed of sheet metal having a series of integrally formed oppositely disposed straps providing a wire receiving opening, a wire shackle having one end positioned in said opening and held therein by the straps which are pressed against the wire and impinged against the opposite sides to hold the end securely in position, said plate also having a tunnel for receiving the opposite end of the shackle wire, said tunnel being formed of the oppositely disposed portions of the plate, formed by parallel slits in the plate, each of said portions being flared at its entry end to facilitate the entry of the end of the shackle wire into said tunnel whereby said end may be sealed by means of a sealing press, substantially described.

BRUCE BORLAND.